United States Patent
Muramatsu (10) Patent No.: US 6,645,907 B2
(45) Date of Patent: Nov. 11, 2003

(54) PHOTOOXIDATION CATALYST AND MANUFACTURING METHOD THEREFOR

(75) Inventor: Keiichi Muramatsu, Hamamatsu (JP)

(73) Assignee: Yamaha Corporation, Shizuoka-Ken (JP)

(*) Notice: Subject to any disclaimer, the term of this patent is extended or adjusted under 35 U.S.C. 154(b) by 0 days.

(21) Appl. No.: 10/274,003

(22) Filed: Oct. 21, 2002

(65) Prior Publication Data

US 2003/0040431 A1 Feb. 27, 2003

Related U.S. Application Data

(62) Division of application No. 09/886,836, filed on Jun. 21, 2001, now Pat. No. 6,555,498.

(30) Foreign Application Priority Data

Jun. 22, 2000 (JP) ........................................ 2000-188301

(51) Int. Cl.$^7$ ........................... B01J 23/02; B01J 23/06; B01J 23/16; B01J 23/18; B01J 23/20

(52) U.S. Cl. ................. 502/340; 502/341; 502/342; 502/343; 502/349; 502/350; 502/351; 502/353; 502/354; 502/242; 502/247; 502/250; 502/253

(58) Field of Search .................. 502/340, 341, 502/342, 343, 349, 350, 351, 353, 354, 527.12, 242, 247, 250, 253

(56) References Cited

U.S. PATENT DOCUMENTS

| | | | | |
|---|---|---|---|---|
| 4,186,110 A | * | 1/1980 | Jalan et al. ................. 252/447 |
| 4,442,223 A | * | 4/1984 | Chester et al. ................ 502/68 |
| 4,677,084 A | * | 6/1987 | Bergna .......................... 502/8 |
| 5,141,822 A | * | 8/1992 | Matsuo et al. .............. 428/623 |
| 5,212,131 A | * | 5/1993 | Belding ........................ 502/60 |
| 5,439,957 A | * | 8/1995 | Takimoto et al. ........... 524/101 |
| 5,506,091 A | * | 4/1996 | Suzuki et al. ............... 430/324 |
| 5,626,975 A | * | 5/1997 | Swank ........................ 428/701 |
| 5,641,723 A | * | 6/1997 | Bonnemann et al. ....... 502/326 |
| 5,686,150 A | * | 11/1997 | Matsumoto ................. 427/558 |
| 5,759,697 A | * | 6/1998 | Swank ........................ 428/432 |
| 5,840,649 A | * | 11/1998 | Ichiki et al. ................ 502/324 |
| 5,900,386 A | * | 5/1999 | Freund et al. .............. 502/330 |
| 5,922,394 A | * | 7/1999 | Trapani et al. ................ 427/64 |
| 6,107,238 A | * | 8/2000 | Contractor et al. .......... 502/247 |
| 6,228,480 B1 | * | 5/2001 | Kimura et al. .............. 428/328 |
| 6,372,354 B1 | * | 4/2002 | Park et al. ................... 428/447 |
| 6,440,378 B1 | * | 8/2002 | Hirata et al. ............. 423/239.1 |
| 6,468,934 B2 | * | 10/2002 | Nagashima et al. .......... 501/64 |
| 6,551,960 B1 | * | 4/2003 | Laine et al. ................. 502/327 |

* cited by examiner

*Primary Examiner*—Cam N. Nguyen
(74) *Attorney, Agent, or Firm*—Dickstein, Shapiro, Morin & Oshinsky, LLP.

(57) ABSTRACT

A photocatalyst and a manufacturing method therefore, in which the adhesion to a support is increased and a baking step is simplified. The photocatalyst comprises the support and a metallic oxide layer provided on the support by applying and baking a colloidal solution including at least a metallic oxide precursor on the support, wherein the metallic oxide layer includes a high density metallic oxide layer of a less porous structure and a low density metallic oxide layer of a more porous structure.

15 Claims, 3 Drawing Sheets

PHOTOOXIDATION CATALYST AND MANUFACTURING METHOD THEREFOR

This is a divisional of U.S. patent application Ser. No. 09/886,836, filed Jun. 21, 2001, U.S. Pat. No. 6,555,498, issued Apr. 29, 2003.

BACKGROUND OF THE INVENTION

1. Field of the Invention

The present invention relates to a photocatalyst which promotes the oxidation-reduction reaction of materials included in a solution or a gas by using photoenergy, and also relates to a manufacturing method therefor.

2. Description of the Related Art

When semiconductors, such as titanium oxide, strontium titanate, or cadmium sulfide, are irradiated by light, such as ultraviolet radiation, having higher energies than in the respective semiconductor band gaps, electrons accumulate in conduction bands, and holes are generated in valence bands.

Photocatalyst activation, in which organic compounds in the atmosphere are decomposed by oxidation-reduction reactions based on electron transfer caused by the accumulated electrons and the holes, and thereby providing sterilizing effects, is known and studies are being undertaken for industrial application of this photocatalyst activation.

Since the photocatalytic reaction is activated at the surface of the photocatalyst, it is necessary to increase the specific surface area of the photosemiconductor in order to enlarge the surface of the photocatalyst, for the purpose of effectively using the function of the photocatalyst.

Japanese Unexamined Patent Application, First Publication No. Hei 11-144772 discloses a semiconductor electrode consisting of a porous metallic oxide, in which two pore groups are interspersed, one group consisting mainly of large pores and the other group consisting mainly of small pores.

In this semiconductor electrode, the specific surface area of the photocatalyst is enlarged by the small pores, and functional molecules, such as sensitizing dyes, can be delivered throughout the porous metallic oxide by the large pores. Therefore, the conversion efficiency of a photoelectric cell, for example, can be improved.

However, according to the Japanese Unexamined Patent Application, First Publication No. Hei 11-144772, a set of steps of applying a colloidal solution onto a support by using the dipcoat method, the spincoat method, the doctorblade method, or the like, and of baking it at a high temperature of approximately 400□ is required to be repeated. Therefore, the following problems occur:

(1) Since the coated film thickness, which can obtained by one set of the processes of applying and baking by the dipcoat method, the spincoat method, the doctor blade method, or the like, is thin, the set of processes must be repeated many times until the coated film acquires the desired thickness, so it takes a long time to obtain the desired thickness.

(2) Once a thick film is formed by the above-stated application process, fine cracks arise due to contraction during film formation, the adhesion of the film to the support or the binding of the films to each other is lowered, so the films tend to separate from each other or from the support.

(3) Since it is required to separate the step of applying a colloidal solution onto the support from the step of baking, to carry out the step of baking after the step of applying, and to repeat the set of the steps of applying and baking until obtaining the desired film thickness, the manufacturing process is complicated.

SUMMARY OF THE INVENTION

The present invention has been made to solve the problems described above. An object of this present invention is to provide a photooxidation catalyst and its manufacturing method, which increases the adhesion of the photooxidation catalyst to the support, and for which the steps of applying and baking in its manufacturing process are simplified.

The present invention provides a photooxidation catalyst comprising a support and a metallic oxide layer provided on the support, wherein the metallic oxide layer has a cross-sectional structure in which a surface region of the metallic oxide layer is more porous than a base region of the metallic oxide layer which is adjacent to the support.

The metallic oxide layer may be formed by applying a colloidal solution including at least one metallic oxide precursor on the support while baking the colloidal solution applied on the support. The metallic oxide layer may have a two-layered structure, in which a low density metallic oxide layer of a porous structure is laminated onto a high density metallic oxide layer. The two-layered structure may be formed by applying a first colloidal solution which includes at least one metallic oxide precursor while baking the first colloidal solution applied onto the support, so as to form the high density metallic oxide layer, and thereon applying a second colloidal solution which includes at least one metallic oxide precursor and an organic compound while baking the second colloidal solution applied onto the high density metallic oxide layer, so as to form the low density metallic oxide layer.

The present invention also provides a manufacturing method of a photooxidation catalyst, comprising the steps of producing a gel from a mixed solution including at least one metallic compound, hydrolyzing and dehydrocondensing the metallic compound in the gel to produce a colloidal solution including a metallic oxide precursor, and applying the colloidal solution onto a support while baking the colloidal solution applied onto the support to form a metallic oxide layer.

The metallic oxide precursor may include fine particles of metallic oxide and/or partially hydrolyzed metallic compounds. The step of applying the colloidal solution onto a support while baking the colloidal solution applied on the support may be carried out by spraying the colloidal solution on a preheated support, and approximately simultaneously baking the colloidal solution by heat of the preheated support to form the metallic oxide layer. The step of applying the colloidal solution onto a support while baking the colloidal solution applied onto the support may be carried out to form the metallic oxide layer by the steps of applying a first colloidal solution which includes at least one metallic oxide precursor while baking the first colloidal solution applied onto the support, so as to form a high density metallic oxide layer, and subsequently applying a second colloidal solution which includes at least one metallic oxide precursor and an organic compound while baking the second colloidal solution applied onto the high density metallic oxide layer, so as to form a low density metallic oxide layer of the porous material.

The manufacturing method of a photooxidation catalyst may further include a step of impregnating the metallic oxide layer formed on the support with a metallic compound solution and then baking.

The present invention also provides a manufacturing method of a photooxidation catalyst comprising the steps of heating a support, applying a first colloidal solution including at least one metallic oxide precursor and a solvent onto the support while heating the support, and removing the solvent from the first colloidal solution to form a first metallic oxide layer on the support.

The manufacturing method may further include the steps of applying a second colloidal solution including at least one metallic oxide precursor, an organic compound, and a solvent onto the first metallic oxide layer, and removing the solvent from the second colloidal solution to form a second metallic oxide layer on the first metallic oxide layer which is less porous than the second metallic oxide layer.

DETAILED DESCRIPTION OF THE INVENTION

In the following, an embodiment according to the present invention will be explained with reference to the drawings.

Figures 1A, 1B:
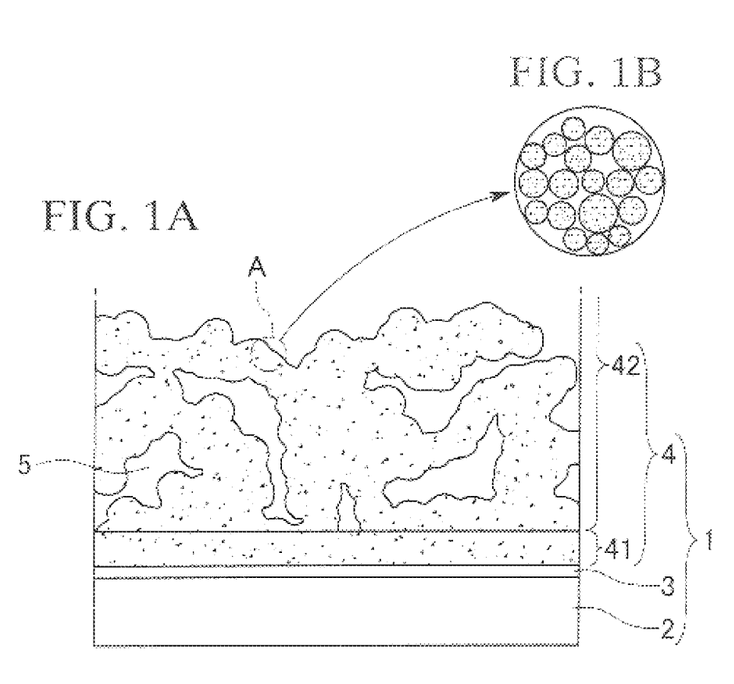
FIG. 1A is a cross-sectional view of a photooxidation catalyst of an embodiment according to the present invention.
FIG. 1B is an enlarged cross-sectional view of fine particles of metallic oxides at portion A of FIG. 1A.

FIG. 1A is a cross-sectional view of a photooxidation catalyst of an embodiment according to the present invention. In FIG. 1A, a photooxidation catalyst 1 is formed by laminating a conductor layer 3 onto a base plate 2, and thereon laminating a metallic oxide layer 4. The metallic oxide layer 4 has a two-layered structure, in which a low density metallic oxide layer 42 of a porous material is laminated onto a high density metallic oxide layer 41.

As shown in FIG. 1A, the low density metallic oxide layer 42 has a porous structure, in which large pores such as a pore 5 are formed, and thereby enlarging the specific surface area of the low density metallic oxide layer 42.

When the photooxidation catalyst 1 is used as a dye sensitization form of a photoelectric cell or a photosensor, for example, a high-efficiency photoelectric cell or a high-sensitivity photosensor can be obtained, because the photooxidation catalyst 1 has an enlarged specific surface area, which can sufficiently adsorb and carry sensitizing dyes.

The film thickness of the low density metallic oxide layer 42 shown in FIG. 1A can be determined in accordance with the type of functional molecules to be adsorbed or the like.

When the sensitizing dyes are adsorbed to the photooxidation catalyst 1 so that the photooxidation catalyst 1 can be used as a dye sensitization form of a photoelectrode, for example, the film thickness of the low density metallic oxide layer 42 may be preferably approximately 1 to 80 $\mu$m.

The density of the high density metallic oxide layer 41 is preferably 6 to 15 $g/cm^3$. The density of the low density metallic oxide layer 42 is preferably 4 to 8 $g/cm^3$. The porosity of the high density metallic oxide layer 41 is preferably 10 to 50 percent by volume, more preferably 20 to 40 percent by volume, relative to the total volume of the high density metallic oxide layer 41. The porosity of the low density metallic oxide layer 42 is preferably 30 to 70 percent by volume, more preferably 40 to 50 percent by volume, relative to the total volume of the low density metallic oxide layer 42. However, the density and the porosity of the high density metallic oxide layer 41 and the low density metallic oxide layer 42 are not limited to the above-described values.

The high density metallic oxide layer 41 of the metallic oxide layer 4 shown in FIG. 1A is less porous than the low density metallic oxide layer 42, and does not substantially include enlarged pores such as a pore 5 of the low density metallic oxide layer 42 of the porous material. The diameter of the pores formed in the high density metallic oxide layer 41 is no more than the particle diameter of a fine particle 43 of metallic oxide included in the high density metallic oxide layer 41. The diameter of the pores formed in the high density metallic oxide layer 41 may be preferably 10 to 100 nm, more preferably 15 to 30 nm. However, the diameter of the pore formed in the high density metallic oxide layer 41 is not limited to the above-described values.

Therefore, the high density metallic oxide layer 41 can tightly adhere to the conductor layer 3, and the total strength of the metallic oxide layer 4 can be also increased.

Therefore, when the photooxidation catalyst 1 is used as an element of a photoelectrode or the like, for example, the metallic oxide layer 4 is prevented from cracking during forming of the element, and shows a satisfactory workability.

Moreover, since the high density metallic oxide layer 41 has a less porous structure, the electric conductivity of the high density metallic oxide layer 41 is superior to that of the low density metallic oxide layer 42 of the porous material. Therefore, the photooxidation catalyst 1 can prevent a loss of an electrical current, which is generated by the irradiation of light and is transferred to the conductor layer 3, by disposing the high density metallic oxide layer 41 between the conductor layer 3 and the low density metallic oxide layer 42 of the porous structure.

The film thickness of the high density metallic oxide layer 41 is preferably set to 1 to 10 $\mu$m. When the film thickness of the high density metallic oxide layer 41 is under 1 $\mu$m, the adhesion and the workability of the high density metallic oxide layer 41 tends to decrease. In contrast, when the film thickness of the high density metallic oxide layer 41 is over 10 $\mu$m, the specific surface area of the high density metallic oxide layer 41 tends to be reduced, though the workability of the high density metallic oxide layer 41 is improved. Therefore, when the photooxidation catalyst 1 is used for the photoelectrode, the amount of the sensitizing dyes which can be adsorbed onto the high density metallic oxide layer 41 tends to decrease, and the energy conversion efficiency also tends to decrease.

The high density metallic oxide layer 41 may be made of the same metallic oxide as the low density metallic oxide layer 42 or of a metallic oxide different from that of the low density metallic oxide layer 42, in accordance with the intended use of the photooxidation catalyst 1. The high density metallic oxide layer 41 is preferably made of the same metallic oxide as that of the low density metallic oxide layer 42, in order to improve the adhesion between the high density metallic oxide layer 41 and the low density metallic oxide layer 42, to simplify the manufacturing steps of the photooxidation catalyst 1, and to optimize the function of the photooxidation catalyst 1.

Specific examples of the metallic oxides used for the photooxidation catalyst 1 include titanium oxide, zinc oxide, vanadium oxide, strontium titanate, and the like. When the photooxidation catalyst 1 is used as the energy conversion element of a photoelectrode or the like, metallic oxides, such as titanium oxide, strontium titanate, or the like, are preferably used.

The conductor layer 3 is disposed between the base plate 2 and the metallic oxide layer 4 as necessary. The material used for the conductor layer 3 may be a thin film having electric conductivity. When the photooxidation catalyst 1 is used as a photoelectrode or the like, transparent conductive films made of FTO (fluorine-doped tin oxide), ITO (indium tin oxide), or the like, are preferably used for the conductor layer 3.

In the following, a manufacturing method of the photooxidation catalyst 1 shown in FIG. 1A will be explained.

The metallic oxide layer 4 including the high density metallic oxide layer 41 and the low density metallic oxide layer 42 of the porous structure can be obtained by producing a gel from a mixed solution including at least one metallic compound, hydrolyzing and dehydrocondensing the metallic compound in the gel to produce a colloidal solution including a metallic oxide precursor, and applying the colloidal solution onto a support while baking the colloidal solution applied onto the support to form a metallic oxide layer. The metallic oxide precursor includes fine particles of metallic oxide and/or partially hydrolyzed metallic compounds In the colloidal solution including a metallic oxide precursor, fine particles of metallic oxide having small particle diameters are uniformly dispersed, and/or metallic compounds are partially hydrolyzed. The colloidal solution may be a suspension such as a slurry.

In order to form fine particles of metallic oxide, the particle diameter is controlled by adding an appropriate quantity of water to the gel including the metallic compound. Thereby, the metallic compound is hydrolyzed and dehydrocondensed, and the fine particles of metallic oxide are deposited effectively in the gel which limits the dispersion of the fine particles of metallic oxide. At this time, the formation of large-sized particles and the precipitation of particles are prevented. Thus, a colloidal solution, in which fine particles having small particle diameters are uniformly dispersed, can be obtained. The particle diameter of metallic oxide is preferably 5 to 30 $\mu$m.

In order to partially hydrolyze the metallic compound, the quantity of water is controlled to be insufficient to completely hydrolyze the metallic compound, but to be sufficient to partially hydrolyze the metallic compound.

The viscosity of the colloidal solution may be preferably set to 0.1 to 1 g/cm□s (10 to 100 cps), more preferably 0.2 to 0.5 g/cm□s (20 to 50 cps).

In order to form the high density metallic oxide layer 41, a first colloidal solution is used. In order to form the low density metallic oxide layer 42 of the porous material, a second colloidal solution is prepared. The first colloidal solution and the second colloidal solution differ in the presence of an organic compound in the second colloidal solution.

The first colloidal solution used for the high density metallic oxide layer 41 is generated by heating a mixed solution in which a metallic compound is mixed with a solvent or the like, to produce a gel, and hydrolyzing and dehydrocondensing the metallic compound in the gel which is kept at a constant temperature to produce a colloidal solution.

The second colloidal solution used for the low density metallic oxide layer 42 of the porous structure is generated by adding an organic compound to the mixed solution in which the metallic compound is mixed with the solvent or the like, and hydrolyzing and dehydrocondensing the metallic compound in the gel which is kept at a constant temperature to produce a colloidal solution.

The organic compound used may be a low molecular organic compound or a high molecular organic compound, in which at least two groups selected from a carboxyl group, an amino group, a hydroxyl group, and the like, are included.

Although there is no particular limitation imposed on the low molecular organic compound, specific examples of the low molecular organic compound include dicarboxylic acid, diamine, diol, diamide acid, and the like.

The high molecular organic compound used may be a high molecular organic compound having at least one of a carboxyl group, an amino group, a hydroxyl group, an amic acid structure, or the like, in its main chain or its side chain. That is, the high molecular organic compound used may be selected from compounds which may have any structure as their main chain structure, such as polyethylene resins, polystyrene resins, polyacrylate resins, polymethacrylate resins, polycarbonate resins, polyester resins, cellulose resins, silicone resins, vinyl polymers, polyamide resins, polyamideimide resins, polyurethane resins, polyurea resins, copolymers thereof, or the like, and which have at least two functional groups selected from a carboxyl group, an amino group, a hydroxyl group, an amic acid structure, and the like, in side chains or crosslinking portions thereof.

In order to produce the metallic oxide precursor, at least one metallic compound is used. Provided that the metallic compound is soluble in the solvent used, there is no other limitation imposed on the metallic compound. Specific examples of the metallic compound include metallic halides such as $TiCl_4$, $ZnCl_2$, $WCl_6$, $SnCl_2$, and $SrCl_6$; nitrates such as $Ti(NO_3)_4$, $Zn(NO_3)_2$, and $Sr(NO_3)_2$; carboxylates such as $V(CH_3COO)_2$, $Zn(CH_3COO)_2$, and $Sn(CH_3COO)_4$; metallic alkoxides represented by the general formula M(OR)n (in which M represents a metallic element, R represents an alkyl group, and n represents the oxidation number of the metallic element represented by M), a metallic complex compound, a chelate compound, and the like. Specific examples of the metallic alkoxide represented by the general formula of M(OR)n include zinc diethoxide, tungsten hexaethoxide, vanadyl diethoxide, tin tetraisopropoxide, strontium diisopropoxide, and the like.

When a thin film including fine particles of composite oxides such as strontium titanate is formed as the metallic oxide layer 4, a double alkoxide, in which two or more metals contained in the thin film are included in one molecule, may be used.

When a thin film including fine particles of titanium oxide is formed as the metallic oxide layer 4, titanium tetraisopropoxide, titanium tetranormalpropoxide, titanium tetraethoxide, titanium tetranormalbutoxide, titanium tetraisobutoxide, titanium tetratertiarybutoxide, or the like, may be used as the metallic compound.

Although there is no particular limitation imposed on the solvent used for manufacturing the metallic oxide layer 4 shown in FIG. 1A, preferable examples of the solvent include alcohols, such as methanol, ethanol, isopropanol, and butanol. Other examples of the solvent include any substance in which the metallic oxide precursor such as the metallic alkoxide can be dissolved and which does not react with the metallic compound, such as formamide, dimethylformamide, dioxane, and benzene.

In the following, a manufacturing method of a photooxidation catalyst of an embodiment according to the present invention will be further specifically explained. However, the present invention is not limited to the following description.

First, a metallic alkoxide is added to an organic solvent such as alcohol to produce a mixed solution. Then, an appropriate quantity of water which is insufficient to completely hydrolyze the metallic alkoxide, and a catalyst such as hydrochloric acid, nitric acid, sulfuric acid, or acetic acid is added to the mixed solution. At this time, the amount of water and acid to be added can be determined in accordance with the hydrolyzable property of the metallic compound used. When titanium isopropoxide is used for producing a titanium oxide, for example, the amount of water added is preferably approximately 0.05 to 4 times the molar amount of the titanium isopropoxide, more preferably from approximately 0.1 times the molar amount of the titanium isopropoxide to an equimolar amount, and the amount of the acid added is preferably approximately 0.02 times to twice the molar amount of the titanium isopropoxide, more preferably approximately 0.05 to 0.5 times the molar amount of titanium isopropoxide.

The mixed solution including the metallic alkoxide, the alcohol, the water, and the acid is refluxed with stirring in a drying nitrogen flow at room temperature to 150□, preferably at room temperature to 100□. The temperature and the time required for refluxing can be decided in accordance with the hydrolysis tendency of the metallic oxide precursor used. When titanium isopropoxide is used, the temperature is preferably set at approximately 80□, and the time is preferably set at from 30 minutes to 3 hours.

As a result of the refluxing process described above, a first transparent and colorless colloidal solution is obtained. Although hydrolysis of the metallic alkoxide progresses by refluxing, OR groups of (OR)n are partially hydrolyzed in the first colloidal solution, because the amount of water added is insufficient to hydrolyze completely the metallic alkoxide. Thus, since the polycondensation reaction cannot progress in the first colloidal solution, and the first colloidal solution includes, at the most, oligomers having —M—O—M chains, the viscosity of the first colloidal solution does not significantly increase and the first colloidal solution is transparent and colorless. The viscosity of the first colloidal solution is preferably 0.1 to 1 g/cm□s, more preferably 0.2 to 0.5 g/cm□s.

After the first colloidal solution is cooled to room temperature, polyethyleneglycol is added as the organic compound to the first colloidal solution. The polyethyleneglycol is readily soluble in the first colloidal solution in which the metallic alkoxides are partially hydrolyzed in the alcohol, so a uniformly mixed solution can be obtained.

Then, an appropriate amount of water is added to the mixed solution, and it is maintained at preferably room temperature to 150□, more preferably room temperature to 100□, for approximately a few minutes to 1 hour, so as to form a gel.

The gel is maintained at approximately 80□ for 5 to 50 hours, so as to redissolve the gel. Thereby, a second translucent colloidal solution is obtained.

Figure 5:
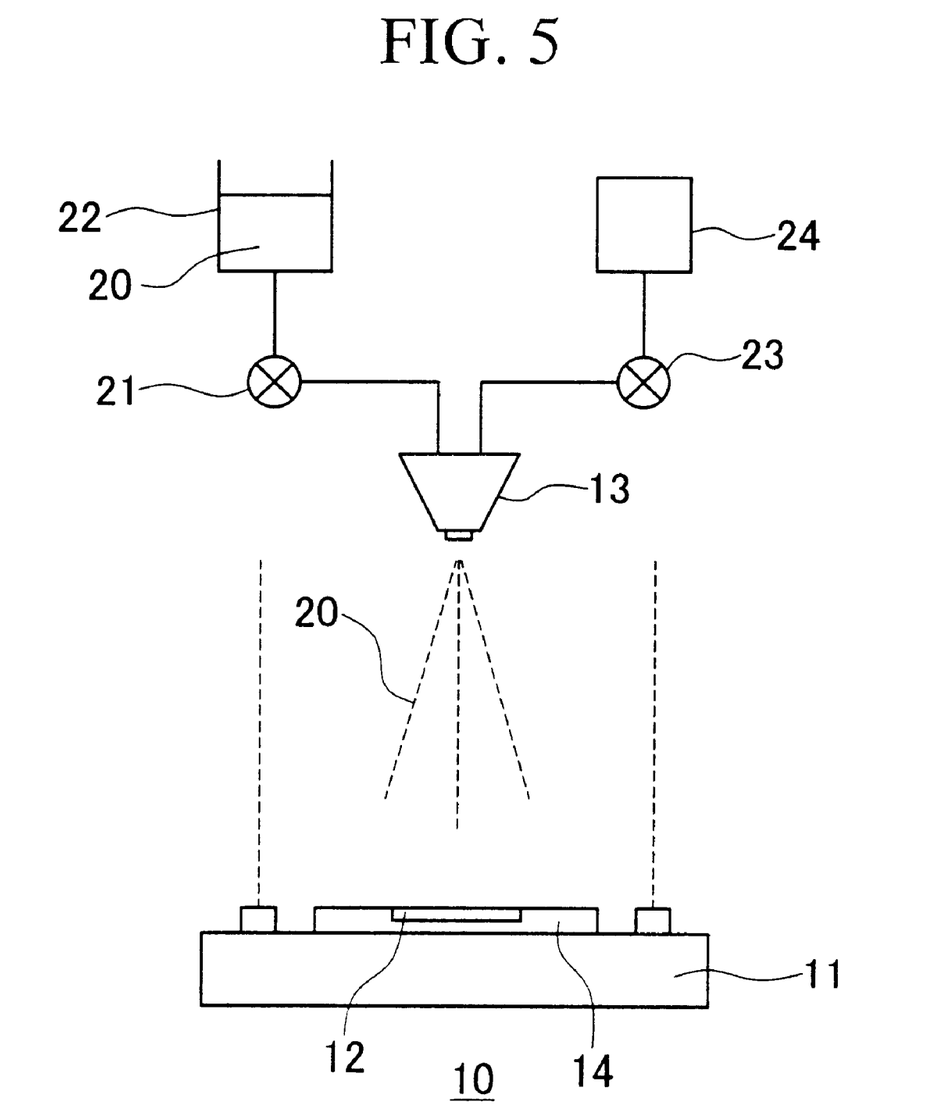
FIG. 5 is a schematic representation showing a spray thermal decomposition apparatus used for manufacturing a photooxidation catalyst of an embodiment according to the present invention.

The first colloidal solution and the second colloidal solution are sprayed onto a base plate which has been heated to approximately 200 to 800□, by using a spray thermal decomposition apparatus shown in FIG. 5. FIG. 5 is a schematic representation showing the spray thermal decomposition apparatus used for manufacturing the photooxidation catalyst 1.

In FIG. 5, the spray thermal decomposition apparatus 10 is provided with a heater 11 which heats a base plate 12, a base plate holder 14 which is disposed on the heater 11 and supports the base plate 12, and a nozzle portion 13 which is disposed above the base plate holder 14 and sprays the first or second colloidal solution (spray liquid) 20 onto the base plate 12.

The nozzle portion 13 is connected through a first regulator 21 with a spray liquid supply portion 22 which is filled with the first or second colloidal solution 20. Moreover, the nozzle portion 13 is connected through a second regulator 23 with a pressure source 24 which supplies compressed air to the nozzle portion 13 which sprays the first or second colloidal solution 20 under pressure.

The first or second colloidal solution 20 is filled into the spray liquid supply portion 22 shown in FIG. 5, and is supplied to the nozzle portion 13 from the spray liquid supply portion 22 while the flow rate of the first or second colloidal solution is regulated by the first regulator 21. At the same time, the compressed air with a flow rate regulated by the second regulator 23 is supplied to the nozzle portion 13 from the pressure source 24.

The first or second colloidal solution 20 supplied to the nozzle portion 13 is pressurized by the compressed air, and then sprayed onto the base plate 12 disposed below the nozzle portion 13.

In order to form the metallic oxide layer 4 having the two-layered structure as the photooxidation catalyst 1 shown in FIG. 1A, the first colloidal solution is filled in the spray liquid supply portion 22, and is sprayed onto the base plate 12, which is heated in advance, from the nozzle portion 13, while the flow rate of the first colloidal solution is regulated by the first regulator 21, and the first colloidal solution is pressurized by the compressed air supplied from the pressure source 24 and regulated by the second regulator 23. The first colloidal solution applied onto the base plate 12 which has been heated is approximately simultaneously baked by the heat of the base plate 12. The first colloidal solution baked onto the base plate 12 forms a uniform film, in which fine particles of the metallic oxides included in the first colloidal solution have been crystallized and baked by the heat of the base plate 12 heated by the heater 11 to form a less porous metallic oxide layer, that is, a high density metallic oxide layer 41, on the base plate 12.

At this time, since the temperature of the base plate 12 is lowered by the first colloidal solution applied onto the base plate 12, the time for spraying the first colloidal solution to the base plate 12 is preferably set to approximately 0.5 to 1 second.

After the temperature of the base plate 12 reaches a predetermined temperature by heating the base plate 12, the first colloidal solution is sprayed again onto the base plate 12 which is maintained at the predetermined temperature. Then, the steps of applying the first colloidal solution onto the base plate 12 while baking the first colloidal solution applied onto the base plate 12 are repeatedly carried out, until the film thickness of the metallic oxide layer reaches a predetermined film thickness.

Then, the second colloidal solution is filled into the spray liquid supply portion 22, and is supplied to the nozzle portion 13 from the spray liquid supply portion 22 while the flow rate of the second colloidal solution is regulated by the first regulator 21. At the same time, the compressed air with a flow rate regulated by the second regulator 23 is supplied onto the nozzle portion 13 from the pressure source 24. Then, the second colloidal solution pressurized in the nozzle portion 13 is sprayed onto the high density metallic oxide layer 41. At this time, the base plate 12 is heated to approximately 500 to 800□ by the heater 11.

Thus, the second colloidal solution is applied onto the high density metallic oxide layer 41 which has been heated by the base plate 12. The second colloidal solution applied onto the high density metallic oxide layer 41 is approximately simultaneously baked by the heat of the high density metallic oxide layer 41. The second colloidal solution baked onto the high density metallic oxide layer 41 forms a uniform film, in which fine particles of the metallic oxides included in the second colloidal solution have been crystallized and baked by the heat of the base plate 12, and from which the organic materials such as polyethyleneglycol included in the second colloidal solution have been eliminated by thermal decomposition. Thereby, a more porous metallic oxide layer, that is, the low density metallic oxide layer 42, is formed on the high density metallic oxide layer 41.

At this time, since the temperature of the high density metallic oxide layer 41 is lowered by the second colloidal solution applied onto the high density metallic oxide layer 41, the time for spraying the first colloidal solution to the base plate 12 is preferably set to approximately 0.5 to 1 second. After the temperature of the high density metallic oxide layer 41 reaches a predetermined temperature by heating the high density metallic oxide layer 41, the second colloidal solution is sprayed again onto the high density metallic oxide layer 41 which is maintained at the predetermined temperature. Then, the steps of applying the second colloidal solution onto the high density metallic oxide layer 41 while baking the second colloidal solution applied onto the high density metallic oxide layer 41 are repeatedly carried out, until the film thickness of the metallic oxide layer reaches a predetermined film thickness.

In this way, the photooxidation catalyst 1 having a two-layered metallic oxide layer 4 including the high density metallic oxide layer 41 and the low density metallic oxide layer 42 may be manufactured.

The photooxidation catalyst 1 is preferably impregnated in the metallic compound solution such as titanium tetrachloride and then baked, so as to form the metallic oxide in the photooxidation catalyst 1. Thereby, the bonding of the fine particles to each other, which form the photooxidation catalyst 1, can be strengthened, so the photooxidation catalyst 1 can be prevented from cracking and the omission of the fine particles of the metallic oxides during formation of an element of the photoelectrode or the like. Therefore, the workability of the photooxidation catalyst 1 can be improved.

According to the manufacturing method described above, since the base plate is heated in advance and is maintained at the predetermined temperature, and the first or the second colloidal solution is applied onto the base plate or the high density metallic oxide layer with heating, the step of applying the first or the second colloidal solution onto the base plate or the high density metallic oxide layer, and the step of baking the first or the second colloidal solution applied onto the base plate or the high density metallic oxide layer can be carried out substantially at the same time. Therefore, the manufacturing steps are simplified to a large degree, so the time and cost required for manufacturing can be reduced.

According to the manufacturing method described above, since the first and the second colloidal solutions are applied by using the spray thermal decomposition apparatus, even when more than one kind of colloidal solution is applied, the time required for preparing to apply these colloidal solutions can be reduced by merely changing the spray liquid supply portion. Thereby, a high density metallic oxide layer having a less porous structure and the low density metallic oxide layer having a more porous structure, in which large pores and small pores are present, can be sequentially formed as shown above. Moreover, metallic oxide layers having two or more layers can be formed in a short time.

Since the cost of the spray thermal decomposition apparatus is low, and the spray thermal decomposition apparatus can form films in a simplified process, and can form thicker films in comparison with the prior art technique, the cost of manufacturing a photooxidation catalyst can be reduced.

EXAMPLES

In the following, the present invention will be explained more specifically by showing examples. However, the present invention is not limited to the following examples.

In a nitrogen atmosphere, 15 g of titanium tetraisopropoxide was diluted with 100 ml of ethanol anhydride, and then 1.3 g of nitric acid having specific gravity of 1.38, and 0.5 ml of water was added and mixed by stirring, to produce a mixed solution. The mixed solution was heated to 80□, and was refluxed in a dry nitrogen flow, to produce a colorless and transparent first colloidal solution.

After the first colloidal solution was cooled to room temperature, 0.5 g of polyethyleneglycol having an average molecular weight of about 20,000 was added with stirring to the first colloidal solution, to produce a colorless and transparent colloidal solution B in which the polyethyleneglycol was completely dissolved.

Then, 5 ml of water was added to the colloidal solution B to produce a uniform, colorless, and transparent colloidal solution, and then the obtained colloidal solution was heated to 80□ in an airtight glass container.

The colloidal solution, after being heated for approximately 5 minutes, formed an approximately transparent and uniform gel. After the gel was further maintained at 80□ for 15 hours, the gel was redissolved to produce the whitish and translucent colloidal solution of a second colloidal solution.

Then, the first colloidal solution was sprayed onto a conductive glass, which was preheated to 200□, by using the spray thermal decomposition apparatus shown in FIG. 5. The conductive glass base plate was obtained by forming FTO, with a thickness of 1 $\mu$m, as a conductor layer on a soda lime glass base plate with a spray thermal decomposition apparatus. The first colloidal solution was sprayed at a rate of 0.5 ml/sec for 0.5 second. The distance between the nozzle portion of the spray thermal decomposition apparatus and the base plate was set at 300 mm.

Figure 2:
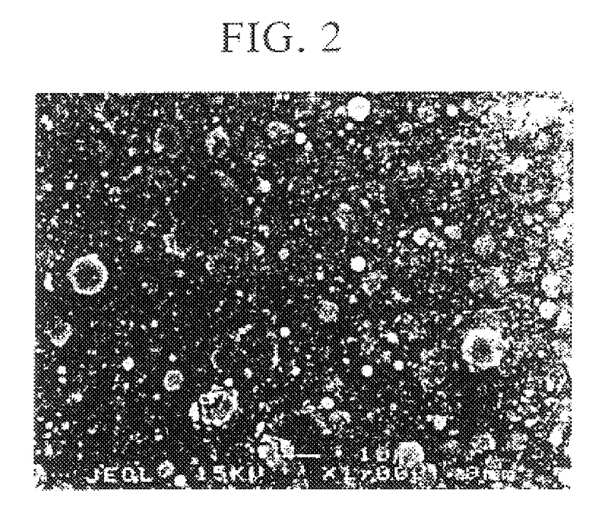
FIG. 2 is a planar electron micrograph of a first titanium oxide layer of a high density metallic oxide layer in a titanium oxide photooxidation catalyst of an embodiment according to the present invention, which was taken by using a scanning electron microscope.

The first colloidal solution applied onto the base plate was baked by the heat of the base plate to form a colorless and transparent film. This application step, as described above, was repeated 100 times to form a titanium oxide layer with a thickness of 10 $\mu$m as a first titanium oxide layer. A planar electron micrograph of the first titanium oxide layer which was taken by using a scanning electron microscope is shown in FIG. 2. As shown in FIG. 2, the first titanium oxide layer has a less porous structure in which the presence of large pores could not be confirmed.

Then, the base plate on which the first titanium oxide layer was formed was maintained by keeping it on a base plate holder and heating to 500□ by a heater. When the temperature of the base plate reached 500□, the second colloidal solution was sprayed onto the first titanium oxide layer by using the spray thermal decomposition apparatus. The second colloidal solution was sprayed at a rate of 0.5 ml/sec for 0.5 second. The distance between the nozzle portion and the base plate was set at 300 mm.

Figure 3:
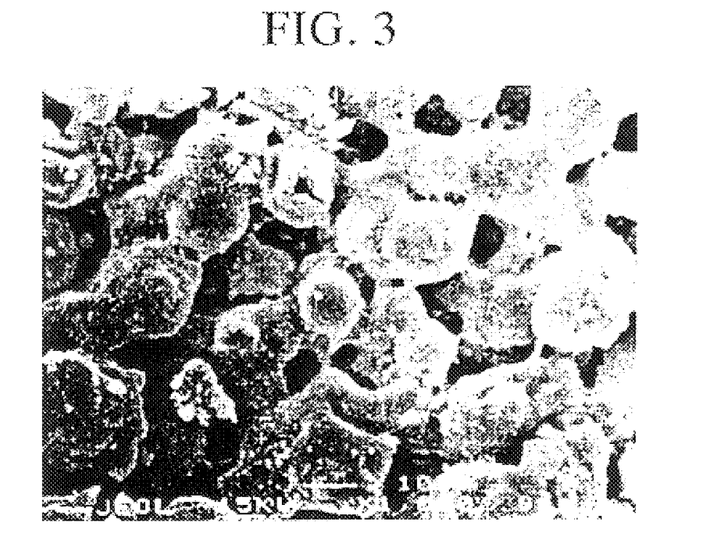
FIG. 3 is a planar electron micrograph of a low density metallic oxide layer in a photooxidation catalyst of an embodiment according to the present invention, which was taken by using a scanning electron microscope.

The second colloidal solution applied onto the base plate was baked by the heat of the base plate, and the polyethyleneglycol included in the second colloidal solution was eliminated by the thermal decomposition, to form a porous, colorless, and transparent film. This application step, as described above, was repeated 400 times to form a porous titanium oxide layer as a second titanium oxide layer. A planar electron micrograph of the second titanium oxide layer which was taken by using a scanning electron microscope is shown in FIG. 3. As shown in FIG. 3, the second titanium oxide layer has a porous structure in which the presence of large and small pores could be found.

Then, the first and second titanium oxide layers were impregnated in titanium tetrachloride, and were baked again at 500□, to produce a titanium oxide photooxidation catalyst.

Figure 4:
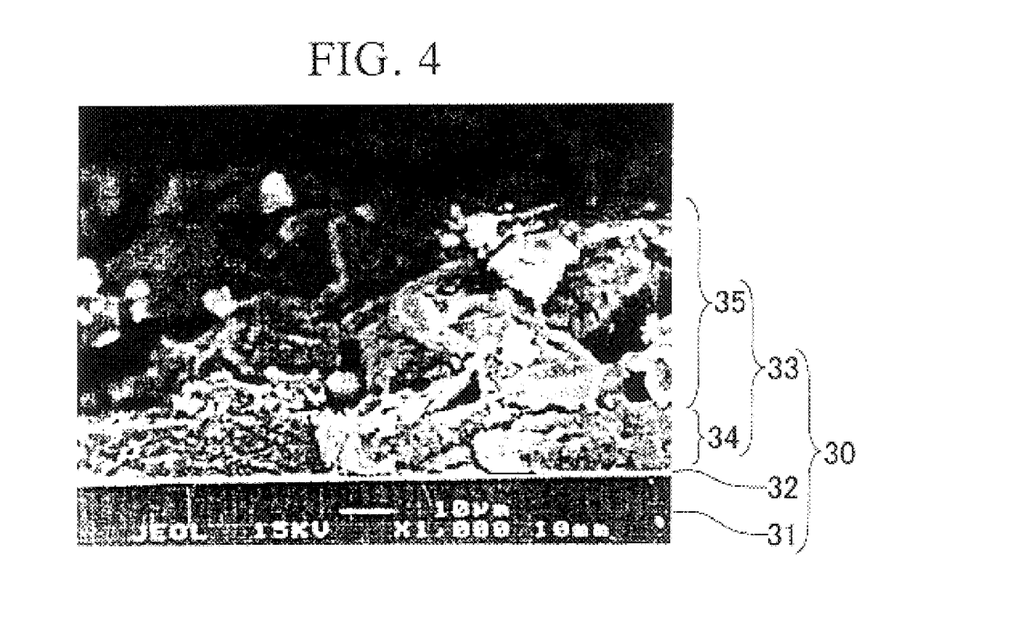
FIG. 4 is a cross-sectional electron micrograph of a titanium oxide photooxidation catalyst of an embodiment according to the present invention, which was taken by using a scanning electron microscope.

□□ A cross-sectional electron micrograph of the titanium oxide photooxidation catalyst which was taken by using a scanning electron microscope is shown in FIG. 4. As shown in FIG. 4, the titanium oxide photooxidation catalyst includes a titanium oxide layer having a two-layered structure, including a first titanium oxide layer of a less porous structure and a second titanium oxide layer of a more porous structure and formed on the first titanium oxide layer.

In the titanium oxide photooxidation catalyst, the adhesion to the conductive film, and the strength of the titanium oxide layer are improved by the first titanium oxide layer, and the amount of functional molecules adsorbed by the titanium oxide photooxidation catalyst can be increased by enlarging the specific surface area of the second titanium oxide layer.

As described above, since a photooxidation catalyst of an embodiment according to the present invention has a metallic oxide layer with a two-layered structure including a high density metallic oxide layer of a less porous structure and a low density metallic oxide layer of a more porous structure, many functional molecules can be adsorbed onto the surfaces of the low density metallic oxide layer with the increased specific surface, and the adhesion to the support can be improved by the high density metallic oxide layer having the less porous structure.

Since the strength of the metallic oxide layer is increased by the high density metallic oxide layer having the less porous structure, the metallic oxide layer can be prevented from cracking during formation of an element of the photoelectrode or the like, and the workability of the metallic oxide layer can be improved.

Particularly, when the metallic oxide layer is impregnated into a metallic compound solution and baked again, the bonding of fine particles to each other included in the metallic oxide layer can be strengthened, and the workability can be further improved.

According to a manufacturing method of the photooxidation catalyst, since colloidal solutions are applied to a base plate by using a spray thermal decomposition apparatus, thicker films can be stably formed in comparison with the prior art technique, and even when more than one kind of colloidal solution is applied, the time required for preparing to apply plural kinds of the colloidal solution can be reduced by merely changing the spray liquid supply portion. Thereby, the high density metallic oxide layer of the less porous structure and the low density metallic oxide layer of the more porous structure can be sequentially formed. Moreover, metallic oxide layers having two or more layers can be formed in a short time.

Since the cost of the spray thermal decomposition apparatus is low and the manufacturing process is simplified, the manufacturing cost of the photooxidation catalyst can be reduced.

What is claimed is:

1. A manufacturing method of a photooxidation catalyst, comprising applying a first colloidal solution comprising a first metallic oxide precursor onto a support while baking the first colloidal solution applied onto the support to form a metallic oxide layer.

2. A manufacturing method according to claim 1, the first metallic oxide precursor comprises 5–30 μm particles of metallic oxide, partially hydrolyzed metallic compound, or mixture thereof, and the viscosity of the colloidal solution is 10–100 cps.

3. A manufacturing method according to claim 1, further comprising applying a second colloidal solution comprising a second metallic oxide precursor onto the support having the baked first colloidal solution thereon while baking the second colloidal solution applied onto the support to form a second metallic oxide layer.

4. A manufacturing method according to claim 3, wherein the first and second colloidal solutions have different compositions such that the first baked metallic oxide layer has a density which is greater than the second baked metallic oxide layer.

5. A manufacturing method according to claim 1, wherein the first baked metallic oxide precursor is a titanium oxide precursor.

6. A manufacturing method according to claim 1, wherein the first baked metallic oxide precursor is a zinc oxide precursor.

7. A manufacturing method according to claim 1, wherein the first baked metallic oxide precursor is a vanadium oxide precursor.

8. A manufacturing method according to claim 1, wherein the first baked metallic oxide precursor is a strontium oxide precursor.

9. A manufacturing method of a photooxidation catalyst, comprising the steps of:
   producing a gel from a mixed solution including at least one metallic compound;
   hydrolyzing and dehydrocondensing the metallic compound in the gel to produce a colloidal solution comprising a metallic oxide precursor; and
   applying the colloidal solution onto a support while baking the colloidal solution applied onto the support to form a metallic oxide layer.

10. A manufacturing method according to claim 9, the metallic oxide precursor comprises fine particles of metallic oxide, partially hydrolyzed metallic compound, or mixture thereof.

11. A manufacturing method according to claim 9, wherein the step of applying the colloidal solution onto a support while baking the colloidal solution applied onto the support is carried out by spraying the colloidal solution onto a preheated support, and approximately simultaneously baking the colloidal solution by heat of the preheated support to form the metallic oxide layer.

12. A manufacturing method according to claim 9, wherein the step of applying the colloidal solution onto a support while baking the colloidal solution applied onto the support is carried out to form the metallic oxide layer by the steps of:

applying a first colloidal solution which comprises at least one metallic oxide precursor while baking the first colloidal solution applied onto the support, so as to form a high density metallic oxide layer; and subsequently applying a second colloidal solution which comprises at least one metallic oxide precursor and an organic compound while baking the second colloidal solution applied onto the high density metallic oxide layer, so as to form a low density metallic oxide layer of porous material.

13. A manufacturing method according to claim 9, further comprising a step of impregnating the metallic oxide layer formed on the support with a metallic compound solution and then baking.

14. A manufacturing method of a photooxidation catalyst, comprising the steps of:

heating a support;

applying a first colloidal solution comprising at least one metallic oxide precursor and a solvent onto the support while heating the support; and removing the solvent from the first colloidal solution to form a first metallic oxide layer on the support.

15. A manufacturing method according to claim 14, further comprising the steps of:

applying a second colloidal solution comprising at least one metallic oxide precursor, an organic compound, and a solvent onto the first metallic oxide layer; and removing the solvent from the second colloidal solution to form a second metallic oxide layer on the first metallic oxide layer which is less porous than the second metallic oxide layer.

* * * * *

UNITED STATES PATENT AND TRADEMARK OFFICE
CERTIFICATE OF CORRECTION

PATENT NO. : 6,645,907 B2 Page 1 of 1
DATED : November 11, 2003
INVENTOR(S) : Keiichi Muramatsu It is certified that error appears in the above-identified patent and that said Letters Patent is hereby corrected as shown below:

Column 1,
Line 50, "400☐" should read -- 400º --.

Column 5,
Lines 62 and 63, "g/cm☐s" should read -- g/cm.s --.

Column 7,
Lines 36 and 65, "150☐" should read -- 150º --;
Lines 37 and 66, "100☐" should read -- 100º --;
Line 41, "80☐" should read -- 80º --; and
Lines 55 and 56, "g/cm☐" should read -- g/cm.s --;

Column 8,
Line 1, "80☐" should read -- 80º --; and
Line 6, "800☐" should read -- 800º --.

Column 9,
Line 13, "400☐" should read -- 400º --

Column 10,
Lines 36, 47 and 50, "80☐" should read -- 80º --; and
Line 54, "200☐" should read -- 200º --.

Column 11,
Lines 8, 9 and 29, "400☐" should read -- 400º --; and
Line 31, "☐☐A" should read -- A --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,645,907 B2
DATED : November 11, 2003
INVENTOR(S) : Keiichi Muramatsu It is certified that error appears in the above-identified patent and that said Letters Patent is hereby corrected as shown below:

Column 1,
Line 50, "400☐" should read -- 400°C --.

Column 7,
Lines 36 and 65, "150☐" should read -- 150°C --;
Lines 37 and 66, "100☐" should read -- 100°C --;
Line 41, "80☐" should read -- 80°C --; and
Lines 55 and 56, "g/cm☐" should read -- g/cm.s --.

Column 8,
Line 1, "80☐" should read -- 80°C --; and
Line 6, "800☐" should read -- 800°C --.

Column 9,
Line 13, "400☐" should read -- 400°C --.

Column 10,
Lines 36, 47 and 50, "80☐" should read -- 80C --; and
Line 54, "200☐" should read -- 200°C --.

Column 11,
Lines 8, 9 and 29, "400" should read -- 400°C --; and
Line 31, "☐☐ A" should read -- A --.

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,645,907 B2  Page 1 of 1
APPLICATION NO. : 10/274003
DATED : November 11, 2003
INVENTOR(S) : Keiichi Muramatsu It is certified that error appears in the above-identified patent and that said Letters Patent is hereby corrected as shown below:

Col. 5, lines 62 and 63, "g/cm☐s" should read --g/cm.s--.

Signed and Sealed this

Thirtieth Day of January, 2007

JON W. DUDAS
*Director of the United States Patent and Trademark Office*